Figure 1:
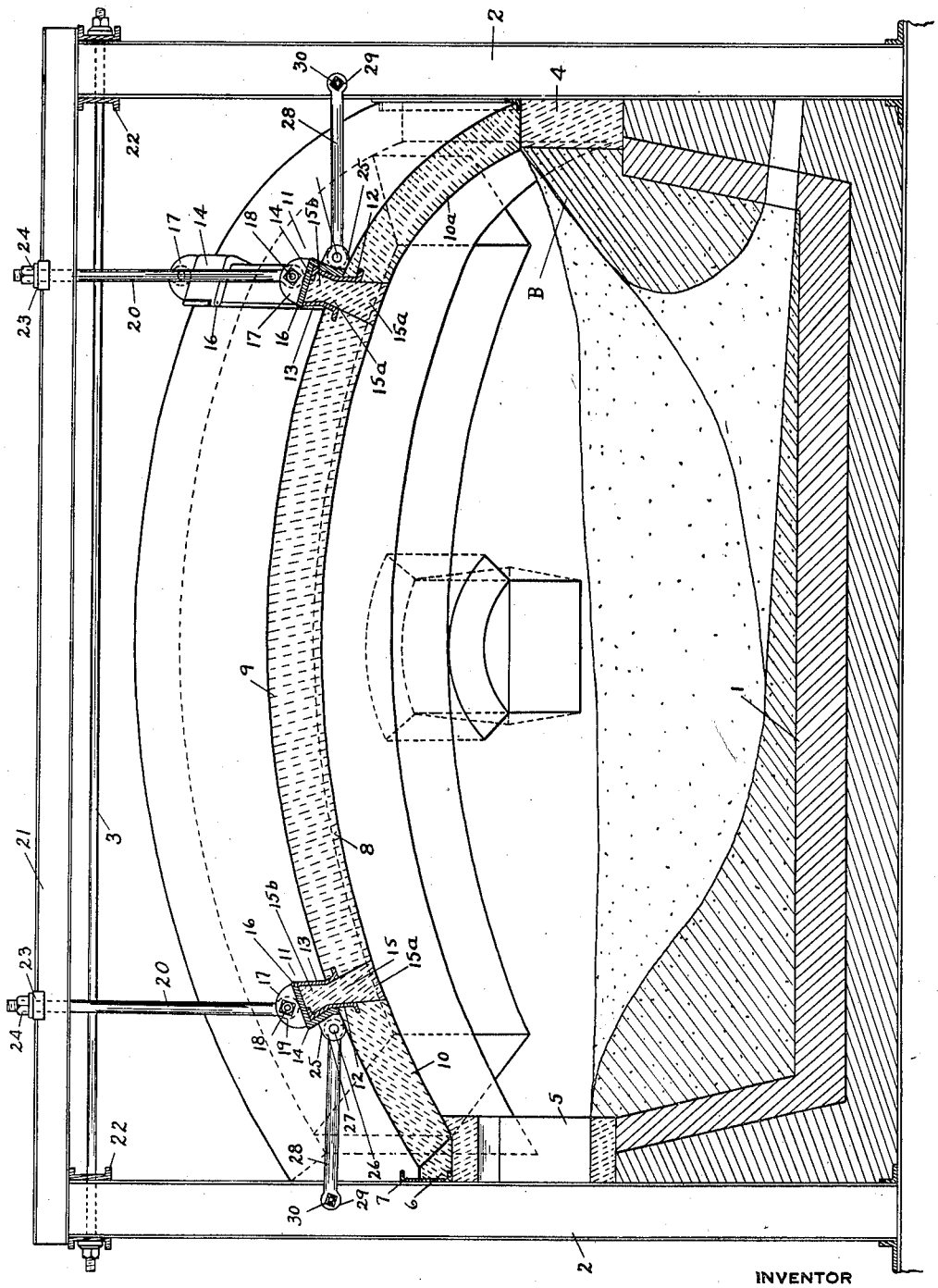

Oct. 2, 1928.

F. H. LOFTUS 1,686,387

ROOF AND WALL CONSTRUCTION FOR OPEN HEARTH FURNACES

Filed May 24, 1927   3 Sheets-Sheet 1

INVENTOR
Fred H. Loftus
by William B. Wharton
his attorney

Oct. 2, 1928.   1,686,387
F. H. LOFTUS
ROOF AND WALL CONSTRUCTION FOR OPEN HEARTH FURNACES
Filed May 24, 1927   3 Sheets-Sheet 2

INVENTOR
Fred H. Loftus
by William B. Wharton
his attorney

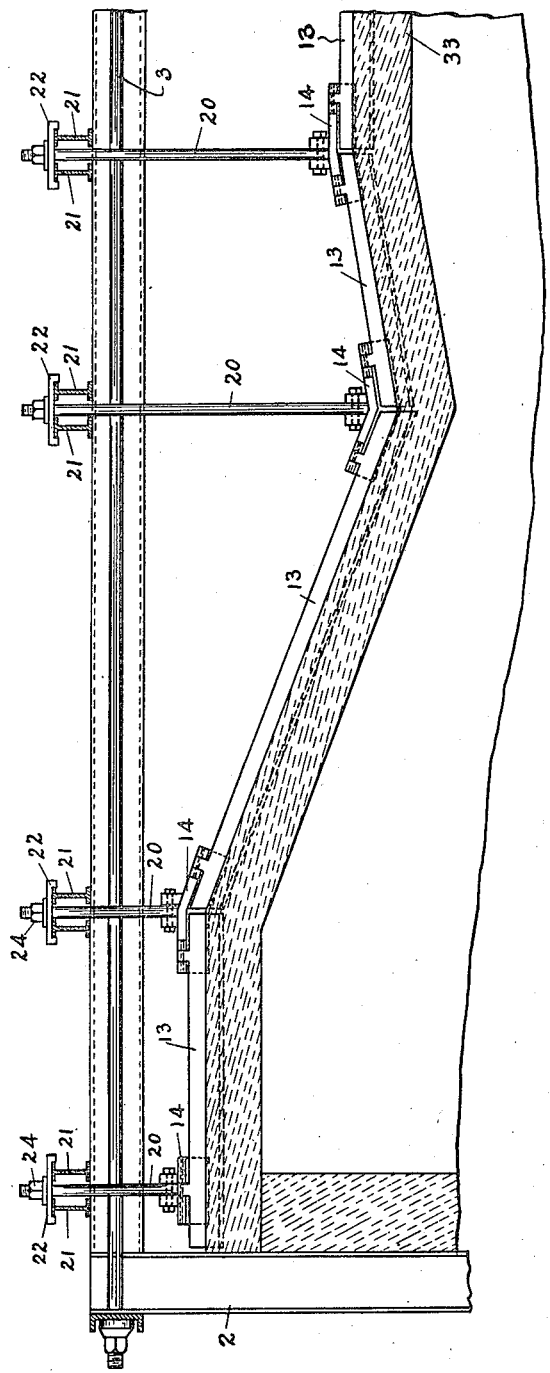

Patented Oct. 2, 1928.

1,686,387

UNITED STATES PATENT OFFICE.

FRED H. LOFTUS, OF PITTSBURGH, PENNSYLVANIA.

ROOF AND WALL CONSTRUCTION FOR OPEN-HEARTH FURNACES.

Application filed May 24, 1927. Serial No. 193,784.

This invention relates to a wall and roof construction for furnaces, and more especially to one for use in basic open hearth furnaces.

In prior open hearth furnace construction the roof and walls usually meet at a point about 5 feet above the fore plate level. The roof has a uniform curvature, and usually rises about 2 feet for an 18 foot span. The roof is constructed entirely of silica brick and is supported on skew-backs, which are located immediately above the walls and rest on a channel construction supported by the binding members of the furnace known as buck-stays.

In this type of construction there is a segment of the roof, adjacent the skew-backs along the front and back walls and over the hearth of the furnace, which is subject to rapid destruction due to the operation of the furnace.

The destruction is caused by abrasion and chemical reaction. During the initial stage of the heat, when the furnace is charged with lime and scrap, the scrap fills the laboratory of the furnace almost to the roof, leaving a channel between the scrap and the back wall and also a channel between the scrap and the front wall. The scrap causes the flame to divide, so that a portion of it passes along the back wall and the remainder along the front wall. The flame thus comes in contact with a section of the brick work, and in contact with the upper portion of the walls, causing this area to become highly heated and to constitute a zone of destruction for both the walls and the roof. The gases, during this initial stage of the heat, abrade the brick work of the roof and walls in these regions until the scrap charge becomes melted. After the iron has been charged, and the lime begins to rise, the gases become laden with basic oxides. During this operation, the furnace has been constantly gaining in temperature, and the portions of both the walls and roof along the skew-backs are at a high temperature. Due to the high temperature in the regions noted, the basic oxides react with the acid material causing a sweating or fluxing action.

In such prior construction the front and back walls of a basic open hearth furnace require frequent repairs and replacement; the usual campaign of the back wall of a furnace being approximately seventy-five heats, and the usual campaign of the front wall approximately one hundred heats. The maintenance of walls has been given a great deal of consideration, and efforts have been made to provide a construction in which the difficulties caused by erosion are overcome. Operators have found that by extending the banking material upwardly on the walls to the level of the skew-back channels, they are able to protect the walls of the furnace. Such is the practice in tilting furnaces, and the same results have been attained in stationary furnaces by an outward extension of the furnace walls with consequent changes in the construction of the frame work of the furnace.

In the present invention there is provided a construction in which the walls may be covered with banking material, without the necessity of any alteration in the width of the furnace or increase in the width of the furnace roof.

In the present invention the usual roof construction, in which a uniformly curved roof is supported on the skew-backs, is replaced by a special wall and roof structure. This structure comprises a uniformly curved central roof portion, supported by auxiliary skews, and intermediate portions which spring from abbreviated front and back walls. These intermediate portions meet the roof section at a point inwardly of the furnace laboratory, which is removed vertically from the skew-backs a sufficient distance to permit this section to take the place of the deleted portion of the furnace wall. In order to secure this effect the segments arising from the front and back walls are formed on the arc of a circle having a much shorter radius than the roof segment which is supported by the auxiliary skews.

The side elements forming the wall and roof members are preferably of chrome brick, or other suitable material which is non-reactive to the basic laden fumes in the furnace, so that they are capable of resisting the chemical and abrasive action of the gases therein. For this reason these roof and wall segments permit a reduction in both the height and thickness of the furnace walls, and provide proper conditions for utilizing bottom material to cover the face of the walls. The form and arrangement of the roof and wall segments is such that their use to replace a portion of the furnace wall does not affect the height of the roof at the center of the furnace, nor does it effect materially the cubical contents of the laboratory of the furnace. Whereas the use of auxiliary skews and chrome brick segments is disclosed and claimed in co-pending application Serial No. 181,062, filed April 5, 1927, such application does not disclose a form and arrangement of the non-reactive segments which permits these segments to replace a relatively great vertical extent of the front or back walls of the furnace.

Figure 2:
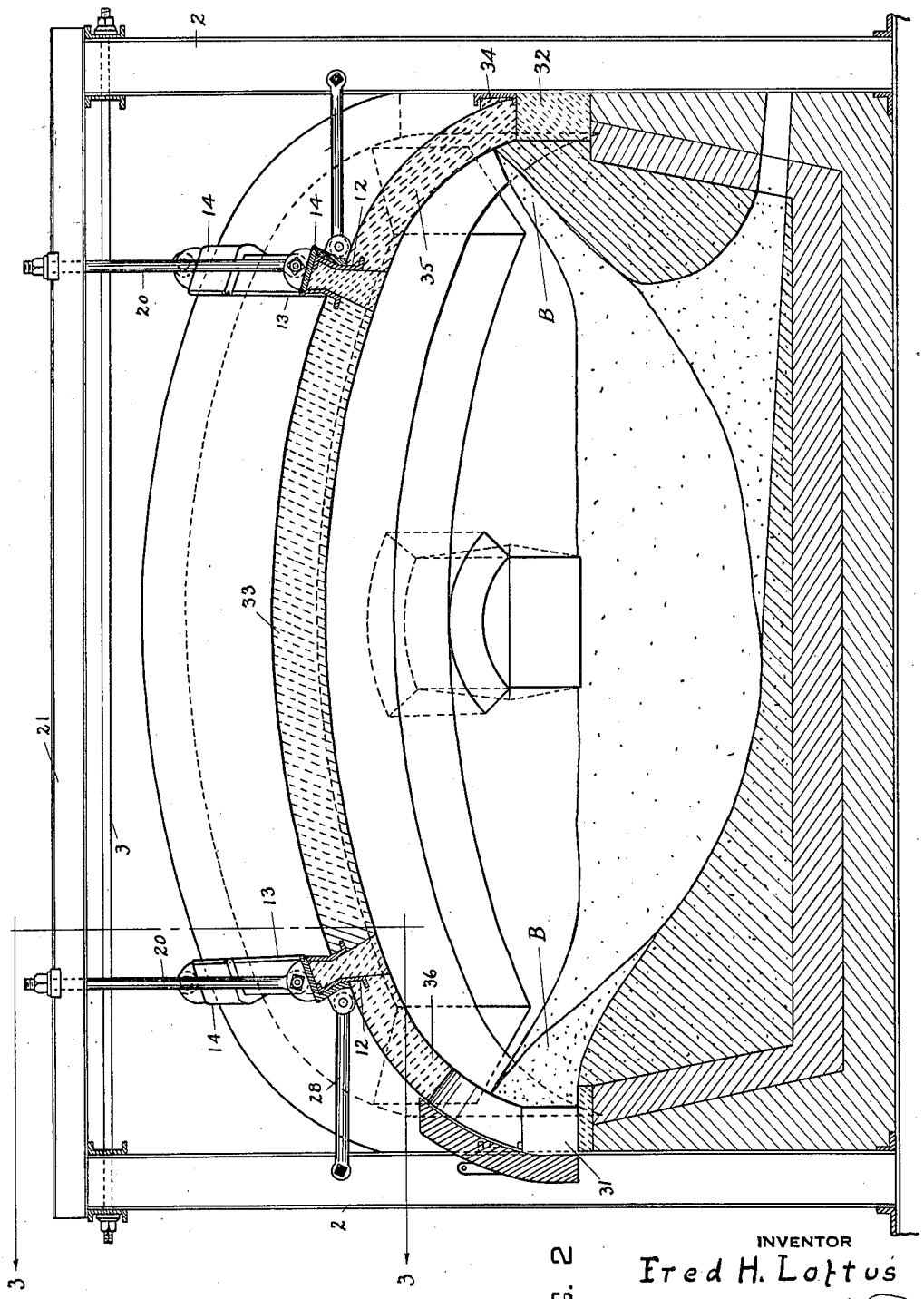

In the accompanying drawings Figure 1 is a vertical transverse section through a furnace embodying the improvements of the present invention, and showing the back wall of the furnace provided with my wall reducing segment; Figure 2 is a similar view, but showing both the front and back walls provided with segments of the same form and arrangement; and Figure 3 is a vertical sectional view taken on the line 3—3 of Figure 2.

In the drawings, and with reference particularly to Figure 1 thereof, the reference numeral 1 designates the hearth of the furnace, and the reference numeral 2 the buck-stays of the furnace frame. Opposite buck-stays are interconnected by tie rods 3. Extending vertically from the hearth 1 of the furnace is the abbreviated back wall 4 and the front wall 5. On front wall 5 is the skew-back 6, which is supported by a channel member 7.

The roof, designated generally by the reference numeral 8, comprises the central or roof portion proper 9 formed of silica brick on a continuous curve. Adjacent the front and back walls of the furnace, are segments or portions 10 and 10$^a$ of a material which is non-reactive to the basic oxides which impinge against these portions of the roof, in what has been herein called the zones of destruction. Such material is desirably chrome brick, but may be magnesite brick, or other suitable refractory material which is non-reactive under the conditions of operation in the furnace. Because of the inability of chrome or magnesite brick to withstand compressive stresses, and for the purpose of facilitating repairs in the furnace roof, means are provided for supporting the load and taking the thrust of the central or roof portion proper 9 independently of these non-reactive portions 10 and 10$^a$.

Such means comprise thrust members, indicated generally by the reference numeral 11, which are interposed between the central or roof portion proper 9 and the outer non-reactive portions 10 and 10$^a$. The thrust members 11 comprise metallic side members 12 and 13, which are interconnected by means of brackets 14. When assembled in a furnace roof, as shown in Figure 3, the bracket members 14 are desirably so positioned as to straddle and interconnect adjacent lengths of the side members 12 and 13.

Between side members 12 and 13 are interposed a succession of blocks 15, which may be of silica brick or other suitable refractory material. As shown in Figures 1 and 2, the blocks 15 are so formed as to have an outwardly inclined lower portion 15$^a$ and an inwardly inclined upper portion 15$^b$. This conformation of the blocks permits them to be securely held in position by the side members 12 and 13, which are angular in section, as shown. In order that the blocks 15 may be inserted between the side members, to be engaged thereby, the member 13 has a hinged connection 16 with the brackets 14 to which it is attached. This side member may, therefore, be raised to permit the insertion of the refractory block, and may be lowered to engage them after their insertion.

The bracket 14 of the assembly is provided with lugs 17 extending upwardly therefrom and having bolt holes for the reception of bolts 18 by which the bracket is connected with the eye 19 of a supporting rod 20. Each of the supporting rods 20 is connected with overhead beams 21 resting on cross-beams 22 which are supported by the buck-stays 2. The supporting means for the rods 20, as shown in Figure 3, comprise plates 23 extending over two of the beams 21, and a nut 24 which rests on the plate 23 and engages a screw threaded portion on the upper end of the rod 20. On one side of the bracket 14 are spaced lugs 25 provided with bolt holes for receiving the bolt 26 passing through an eye 27 on a compression bar 28. At the other end of the compression bar is an eye 29 for receiving a bolt 30 to connect the bar to one of the buck-stays 2.

When in position in the furnace roof the thrust members 11 provide support for the roof, and, because of the thrust bar 28, serve to take the thrust of the central or roof portion proper 9.

With reference to Figure 1 of the drawings, it will be noticed that the side portion or segment 10 rests on the skew-back 6 on front wall 5, while the segment or portion 10$^a$ springs directly from the abbreviated back wall 4. The portion or segment 10 is so curved that it forms a uniform curve with the central or roof portion proper 9. The wall and roof portion or segment 10$^a$, on the contrary, is formed on the arc of a circle of lesser radius than that on which the central roof portion proper 9 is formed. Its vertical extent is thus greater than that of the roof segment or portion 10, and its added vertical extent serves to replace the portion deleted from abbreviated back wall 4.

Being composed of material which is non-reactive to the furnace fumes, the segments 10 and 10ª are also less subject to abrasion, because they are not softened by chemical action at high temperatures. They may, therefore, be of a lesser thickness than the central or roof portion proper 9. Because of the material of which they are made they also do not break down into a viscous silicious material, as do the roof and walls of a basic open hearth furnace, when such roof and walls are made wholly of silica brick. As is well known, such viscous silicious material, when present, flows down the walls of the furnace and so corrodes the same as to greatly reduce their span of useful service.

It will be observed that, owing to the abbreviation of back wall 4, the banking material B, which in a basic open hearth furnace is composed of dolomite or some other calcareous material, or magnesite, may cover the entire vertical extent of the back wall 4. This wall is therefore fully protected from the fumes within the furnace, so that the life of this portion of the furnace is indefinitely extended. As it is thus fully protected, it may also be made of a lesser thickness than is usual for open hearth furnace walls.

In Figure 2 of the drawings both the front wall 31 and back wall 32 of the furnace are abbreviated. The central or roof portion proper 33 is of uniform curvature and similar to the roof portion proper 9 of Figure 1. It is independently supported by similar auxiliary skew-backs 34. In this modification, however, both the intermediate segment or portion 35 between the roof portion proper and back wall, and the intermediate segment or portion 36 between the roof portion proper and the front wall, are formed on the arc of a circle of lesser radius than that on which the roof portion proper is formed. In both instances therefore these wall and roof portions meet the roof portion proper at such vertical point with reference to the abbreviated furnace walls that they serve to replace the deleted portions of such walls.

Both the back and front walls of the furnace, as shown in Figure 2, may be completely covered by the banking material B in the furnace. That is, the entire wall lies within the line formed by the angle of repose of the banking material when it is piled against the sides of the furnace in the furnace hearth.

It should be particularly noticed that this effect is obtained without extending the upper ends of the furnace walls upwardly and outwardly. The present construction therefore avoids the expense and inconvenience incident to such wall structure.

What I claim is:

1. In furnace construction the combination of an abbreviated wall, an independently supported roof section proper, and a wall and roof portion of refractory material rising from the abbreviated wall and meeting the roof portion at a point inwardly of the furnace and at such height that said wall and roof portion takes the place of the deleted portion of the abbreviated wall.

2. In a furnace construction the combination of an abbreviated wall, an independently supported roof section proper, and a wall and roof portion of a material which is non-reactive to basic laden fumes rising from the abbreviated wall and meeting the roof portion at a point inwardly of the furnace and at such height that said wall and roof portion takes the place of the deleted portion of the abbreviated wall.

3. In furnace construction the combination of an abbreviated wall, an independently supported roof section proper, and a wall and roof portion of chemically neutral material rising from the abbreviated wall and meeting the roof portion at a point inwardly of the furnace and at such height that said wall and roof portion takes the place of the deleted portion of the abbreviated wall.

4. In furnace construction the combination of an abbreviated wall, an independently supported roof section proper, and a wall and roof portion of chrome brick rising from the abbreviated wall and meeting the roof portion proper at a point inwardly of the furnace and at such height that said wall and roof portion takes the place of the deleted portion of the abbreviated wall.

5. In furnace construction the combination of an abbreviated wall, an independently supported roof section proper formed on a uniform curve, and a wall and roof portion of refractory material between the roof portion proper and the abbreviated wall, said roof and wall portion being formed on the arc of a circle of lesser radius than that on which the roof is formed.

6. In furnace construction the combination of an abbreviated wall, an independently supported roof proper formed on a uniform curve, and a wall and roof portion of a material which is non-reactive to basic laden fumes between the roof portion proper and the abbreviated wall, said roof and wall portion being formed on the arc of a circle of lesser radius than that on which the roof is formed.

7. In furnace construction the combination of an abbreviated wall, an independently supported roof section proper formed on a uniform curve, and a wall and roof portion of chemically neutral material between the roof portion proper and the abbreviated wall, said roof and wall portion being formed on the arc of a circle of lesser radius than that on which the roof is formed.

8. In furnace construction the combination of an abbreviated wall, an independently supported roof section proper formed on a uniform curve, and a wall and roof portion of chrome brick between the roof portion proper and the abbreviated wall, said roof and wall portion being formed on the arc of a circle of lesser radius than that on which the roof is formed.

9. In furnace construction the combination of a furnace hearth, a furnace roof, a vertical wall so abbreviated as to lie wholly within a line formed by the angle of repose of banking material in the hearth, and a structure of refractory material extending between the abbreviated furnace wall and the furnace roof.

10. In furnace construction the combination of a furnace hearth, a furnace roof, a vertical wall so abbreviated as to lie wholly within a line formed by the angle of repose of banking material in the hearth, and a structure of refractory material which is non-reactive to basic laden fumes extending between the abbreviated furnace wall and the furnace roof.

11. In furnace construction the combination of a furnace hearth, a furnace roof, a vertical wall so abbreviated as to lie wholly within a line formed by the angle of repose of banking material in the hearth, and a structure of chemically neutral refractory material extending between the abbreviated furnace wall and the furnace roof.

12. In furnace construction the combination of a furnace hearth a furnace roof, a vertical wall so abbreviated as to lie wholly within a line formed by the angle of repose of banking material in the hearth, and a structure of chrome brick extending between the abbreviated furnace wall and the furnace roof.

In witness whereof, I hereunto set my hand.

FRED H. LOFTUS.